UNITED STATES PATENT OFFICE.

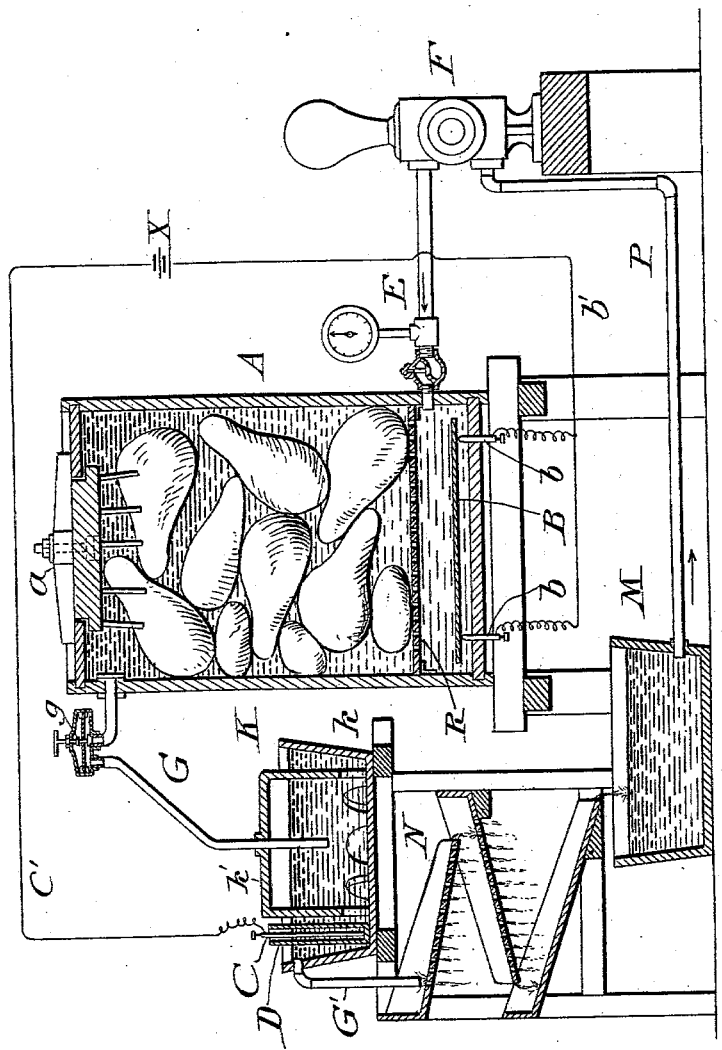

GEORGE A. WASHBURN, OF ELYRIA, OHIO, ASSIGNOR TO B. B. QUINN, TRUSTEE, OF CLEVELAND, OHIO.

PROCESS OF CURING MEAT.

SPECIFICATION forming part of Letters Patent No. 657,258, dated September 4, 1900.

Original application filed August 18, 1898, Serial No. 688,943. Divided and this application filed August 23, 1899. Serial No. 728,227. (No specimens.)

*To all whom it may concern:*

Be it known that I, GEORGE A. WASHBURN, a citizen of the United States, residing at Elyria, in the county of Lorain and State of Ohio, have invented a certain new and useful Improvement in Processes of Curing Meat, of which the following is a full, clear, and exact description, reference being had to the accompanying drawings.

The chief object of my invention is to cure meat or other substances in brine or some analogous curing solution in less time than is required by the methods heretofore practiced for the purpose.

The invention consists in the process and the combined employment of the several steps thereof, as hereinafter described, and pointed out definitely in the claims.

Some apparatus is necessary for the successful practice of the process, and the drawing shows in sectional side elevation an apparatus which may be used.

The meat or other substance to be cured is submerged in the brine or other curing solution in a vat A, having a cover a, which may be tightly closed. The vat should be made of or lined with some material which will not be attacked or disintegrated by the electric current. It may, for example, be made of wood or of metal having a so-called "porcelain" or other vitreous lining. An electric current is caused to flow through the solution which covers the meat. The current may be derived from any suitable generator, which is diagrammatically illustrated in the drawing at X. The circuit-wires c' and b' connect the generator respectively with the positive electrode C and the negative electrode B, which are so arranged that the current flowing between them will pass through the curing solution from one end of the vat A to the other. The negative electrode B, as shown, is a carbon plate which is placed near the bottom of the vat A in contact with and resting upon metal screws b, which pass through the bottom of the tank. One or more of these screws may serve as binding-posts for the attachment of the circuit-wire b'. The positive electrode C is immersed in a fluid conductor, which is preferably water. This water is confined in a porous cup D, which is immersed in the curing solution, preferably in such part of said solution as is contained in a supplemental tank K. A discharge-pipe G, containing a pressure-reducing valve g, connects the upper end of the vat A with the supplemental tank K. When the pump F, to be presently referred to, is in operation, this pipe G contains an unbroken column of the curing solution, which column serves as the conductor for the current in passing from the solution in the supplemental tank K to the solution in the vat. When the electric current is flowing, electrolytic action takes place at the positive electrode C. This electrode, which is preferably a carbon plate, will be disintegrated more or less, and the fluid in which it is immersed will also be decomposed more or less by the electrolytic action. Because of this last-named fact water is preferably used as the fluid conductor in which the positive electrode is submerged. The clay porous cup which contains this fluid conductor is a convenient and efficient instrumentality for producing a very essential result in the practice of the process—namely, it prevents the fluid conductor which it contains, and particularly the products of the electrolytic action therein, from commingling with the curing solution. This step is important for two reasons—namely, it prevents the disintegrated particles of the carbon from entering the curing solution, and hence prevents the deposition of such particles in and on the meat, and it also prevents any chlorine gas from getting into the curing solution, as chlorine gas in said solution will spoil the meat. By osmosis some of the brine will get into the porous cup, and chlorine gas will then be produced therein; but it is produced in such small quantities that it does not cause any appreciable inconvenience to the workman, and, as before stated, it does not get into the curing solution.

In addition to the employment of the electric current substantially as stated the brine is caused to continuously circulate through the vat A and over the meat therein. This result may be produced by a pump F, which draws the brine from a suction-tank M through pipe P and forces it through pipe E into and through the vat A and out of the pipe G into the supplemental tank K. An outlet-pipe G' is provided for this supplemental tank, and it discharges onto the first of a series of inclined plates or pans N, which are preferably perforated. The solution falls from one to the other of these pans and finally into the suction-tank M. These plates are provided for breaking the column of the curing solution between the supplemental tank and the pump, wherefore the electric current of necessity passes through the solution in the pipe G into the solution in the vat. The current leaving the positive electrode C flows through the fluid conductor in which it is submerged, through the column of brine in the pipe G, and through the curing solution in vat A to the electrode B.

The supplemental tank and the pipe connecting it and the vat are preferably made of material which will not be disintegrated by the electrolytic action. The two parts of the pipe G may be made of rubber hose, and the connections between it and the vat and the reducing-valve g may be made of gutta-percha.

The apparatus shown in the drawing is described in detail and the novel parts thereof are claimed in an application, Serial No. 688,943, filed August 18, 1898, of which application this application is a division. As before stated, any suitable apparatus may be used in the practice of the process.

I have found that the best results are obtained when the curing solution is caused to circulate through the vat under a pressure of about twenty pounds and when an electric current of from one to two amperes and one hundred and ten volts is employed. Good results, however, may be obtained by widely varying the fluid-pressure and the voltage and amperage of the electric current, wherefore I do not intend to limit the invention to the pressure or voltage or amperage named.

The process described will cure meat in a small fraction of the time commonly employed for that purpose. The electric current seems to open up the pores of the meat, and the moving brine is forced into the pores and permeates the meat. In addition to the saving of time, the process produces other good results—namely, none of the nutritious ingredients of the meat are lost, but all are retained, wherefore the meat does not lose in weight during the curing operation, but on the contrary slightly gains in weight, due to the injection of salt into it. Moreover, the rapidity with which the curing is effected causes the salt to be distributed evenly throughout the meat, whereas in the old process, owing to the long time the meat is kept in the brine, the meat near the surface contains more salt than does that farther from the surface, wherefore it is often necessary to soak out some of the salt deposited on the meat near its surface before said meat is ready for sale or use. Such supplemental treatment is never necessary with meat cured by the process herein described, said meat being uniformly cured and of an even color throughout.

Having described my invention, I claim—

1. The described process of curing meat and the like, which consists in immersing the same in a curing solution, in passing an electric current from the positive electrode through a fluid conductor and the curing solution, and in preventing said fluid conductor and the product of the electrolytic action therein from commingling with the curing solution.

2. The described process of curing meat and the like, which consists in immersing the same in a curing solution, causing the circulation of said solution over the meat, in passing an electric current from the positive electrode through a fluid conductor and the circulating curing solution, and in preventing the fluid conductor and the products of the electrolytic action therein from commingling with the curing solution.

3. The described process of curing meat and the like, which consists in immersing the same in a curing solution, in passing an electric current from the positive electrode through a fluid conductor, the curing solution, and a porous partition which separates said fluid conductor and curing solution.

In testimony whereof I hereunto affix my signature in the presence of two witnesses.

GEORGE A. WASHBURN.

Witnesses:
R. S. FULTON,
FRANK H. KEMPER.